Jan. 17, 1933.  E. A. NELSON  1,894,321
METHOD OF MAKING A BRAKE BAND
Filed April 23, 1930
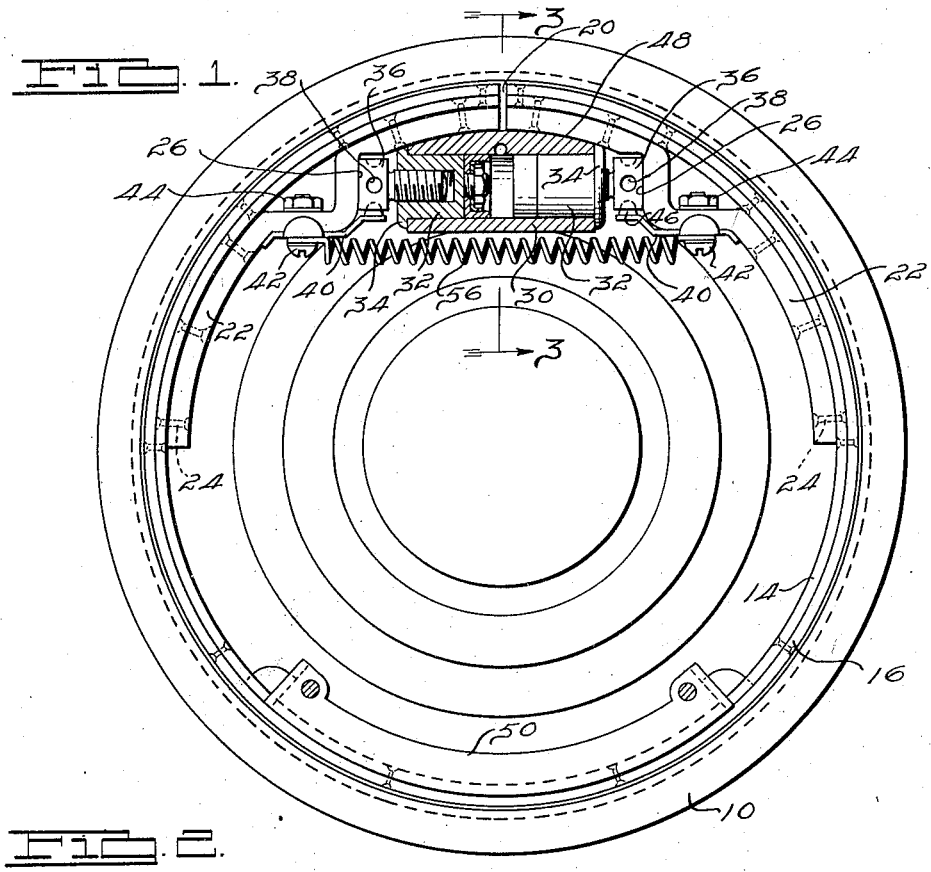
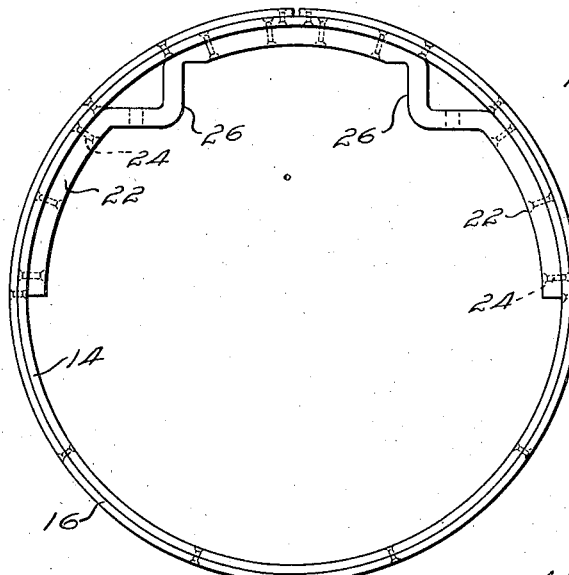
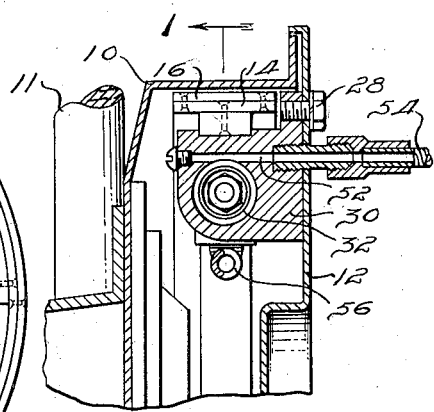
INVENTOR
Emil A. Nelson.
BY
Haines, Wickey, Pierce & Hann
ATTORNEYS.

Patented Jan. 17, 1933

1,894,321

UNITED STATES PATENT OFFICE

EMIL A. NELSON, OF DETROIT, MICHIGAN

METHOD OF MAKING A BRAKE BAND

Application filed April 23, 1930. Serial No. 446,770.

This invention relates to brakes, and particularly to a method of making a band type of friction element for brakes, the principal object being the provision of a method of making such band element which will lend itself to economical manufacture and maintenance of a true form thereof prior to its application to the brake assembly.

Another object is the provision of a method of making a brake band having a pair of reinforcing or contact members at the split portion thereof including forming both of said members as an integral part, applying them to the band as such, and thereafter severing them into separate parts.

The above being among the objects of the present invention the same consists of certain features of construction and methods of manufacture as hereinafter will be more fully explained, reference being had to the accompanying drawing, and then claimed, having the above and other objects in view.

In the accompanying drawing which shows a suitable embodiment of the device forming the subject-matter of the present invention, and in which like numerals refer to like parts throughout the several different views, Figure 1 is an inner side elevation of a brake mechanism with the drum closing or backing plate removed so as to disclose the underlying structure, the brake expanding mechanism being shown in vertical section taken as on the line 1 of Fig. 3, in order to better illustrate the construction of the same.

Fig. 2 is a side elevational view of the friction element shown in Fig. 1 before the reinforcement or contact member for the split ends thereof has been severed into two separate parts.

Fig. 3 is a fragmentary vertical sectional view taken on the line 3—3 of Fig. 1.

As is well known in the art, brakes of the band type are provided with a friction element including a flexible band of approximately 360 degrees or less in extent, split through at one point in the circumference, and the split ends are provided with members usually of a reinforcing nature through which the mechanism provided for expanding the band into contact with the brake drum acts.

Such bands are, of course, usually provided with the ordinary friction facing of any suitable type. It is conventional practice in making such brake bands to form the contact members separately and separately secure them to the split ends of the bands. The band being flexible, is subject to distortion in shipping and handling and it often occurs that by the time the band assembly is ready for assembly with the rest of the brake mechanism, it has been distorted out of its true cylindrical form and thereafter, if not corrected, gives unsatisfactory service, and is often so difficult to correct as to necessitate its destruction. It is this feature of conventional band brakes that the present invention is designed to avoid.

Referring to the drawing and particularly to Figs. 1 and 3, I show, by way of illustration, a brake including a drum 10 which is adapted to rotate with a wheel such as 11, and a backing plate 12 conventionally employed for supporting the non-rotatable portion of the braking mechanism and for closing the open end of the drum to the entrance of dust and dirt.

Within the drum is received a flexible brake band 14 faced with a coextensive layer of friction material 16 in accordance with conventional practice. The band 14 and friction material 16 extend through substantially 360 degrees and is split as at 20 in accordance with conventional practice. A member 22 is secured, as by means of rivets 24, to the split ends of the band 14 and in the particular embodiment shown the combined lengths of these members extend through substantially 180 degrees on either side of the line of split 20. As indicated, each of the members 22 is provided with a vertical shoulder 26.

Secured to the backing plate 12 as by means of cap screws 28 and equally disposed on each side of the line of split 20 is a brake cylinder 30, open at both ends, and within each end of which is slidably received a piston assembly indicated generally as at 32. Heads 34, formed on the pistons 32, contact with their respective ends of the cylinder 30 and limit the inward movement of the pistons 32 so that at their innermost position their inner ends are slightly spaced from each other as indicated in Fig. 1.

A headed screw 36 is threaded axially into each of the pistons 32 with its head in abutting relation with respect to the corresponding shoulder 26 so as to transmit the pressure from the piston 32 to the shoulder 26 and consequently the band 14 during the operation of the brake. By threading the screws in or out in their respective piston, wear on the friction material 16 may be compensated for.

In order to maintain the screws 36 in their adjustably threaded positions, the head of each screw is provided with a plurality of depressions 38, and a spring member 40 secured to each member 22 by means of a screw 42 and nut 44 and having a boss-like end 46 resiliently engageable with the corresponding depressions 38, is provided.

The upper end of the brake cylinder 30 is formed to provide a cylindrical surface 48 concentric with the brake drum and upon which the free ends of the members 22 are adapted to rest when in non-braking position.

A stop member 50 secured to the backing plate 12 adjacent the lower surface of the brake drum serves to limit the amount which the corresponding portion of the friction element may retract from the brake drum during non-braking intervals.

The brake cylinder 30 is provided with a transverse opening 52, as best shown in Fig. 3, which intersects the bore of the brake cylinder 30, and is connected, preferably by means of a flexible tube such as 54, with any suitable or conventional source of fluid under pressure. A coil spring 56 held under tension between the screws 42 constantly urges the brake band 14 to collapsed or non-braking position.

As will be obvious from the above description, when fluid under pressure is transmitted through the tubing 54 and opening 52 into the cylinder between the pistons 32, the pistons 32 are urged outwardly and in moving outwardly urge the free ends of the brake band 14 apart against the force of the spring 56 and into contact with the brake drum 10. If, for instance, the brake drum 10 is turned in a clockwise direction, as illustrated in Fig. 1, as soon as the friction element engages the brake drum the entire friction element assembly will act to turn in a clockwise direction with the drum, and such turning will occur until the shoulder 34 on the left hand piston 32 moves into contact with its corresponding end of the cylinder 30. By this means the brake reaction is transmitted from the brake band 14 to the backing plate 12 and thence to the axle of the vehicle which carries the brake mechanism.

In accordance with the present invention, and as best illustrated in Fig. 2, in the manufacture of the friction element above described the brake band 14 may be formed as a continuous ring.

The inventive feature of the present invention lies in initially forming the two members 22 as an integral part and securing them as such to the band 14, after which the friction material 16 may be applied in the conventional manner. The friction element assembly may then be handled and shipped in this form, as indicated in Fig. 2, until immediately prior to assembling it in a brake drum to form a completed brake, and at which time the member including the elements 22 may be split in line with the desired line of split 20 of the assembly, thus permitting the required expansion and contraction of the friction element assembly in service. By this means the maintenance of the true circular form of the brake band 14 is practically assured at the time of its assembly in the brake mechanism as the flexibility which is necessary in the brake mechanism is not imparted to it until the time that the members 22 are severed from each other, and consequently it is retained in its strongest condition for handling and shipping.

Although the members 22 in the illustrative embodiment shown in the drawing are of a type which is constructed from strip or bar stock and suitably bent to shape, it will be apparent that as far as the present invention is concerned the particular type of these members on the split band is immaterial as is the material from which they are constructed, the essential feature being the formation of such parts as an integer and the securement of such parts as an integral part to the brake band before the severing of such integral part into two pieces is effected.

Formal changes may be made in the specific embodiment of the invention described without departing from the spirit or substance of the broad invention, the scope of which is commensurate with the appended claims.

What I claim is:

1. In the manufacture of a brake band, the method of forming the same which consists in securing a substantially semicylindrical rigid reinforcement to the inner periphery of a resilient cylindrical member, and severing the member and reinforcement mid-way between the ends of the reinforcement immediately before said band is installed so as to obviate distortion thereof.

2. A method of making a brake band which comprises forming a continuous ring of brake band material securing an attaching member to the inner periphery of the ring and severing the ring and member intermediate the ends of the member to form an expansible brake band.

3. The method of making a brake friction element assembly including a split flexible band part and reinforcing members adjacent the line of split thereof, comprising initially forming said members integrally, securing said integrally connected members to said part, and then severing said assembly through said integrally connected members whereby to cause separation of said integrally connected members into separate parts and permitting expansive movement of said assembly.

EMIL A. NELSON.